United States Patent
Lee

(10) Patent No.: US 9,626,669 B2
(45) Date of Patent: Apr. 18, 2017

(54) CARD READER EMULATION FOR CARDLESS TRANSACTIONS

(71) Applicant: Square, Inc., San Francisco, CA (US)

(72) Inventor: Robert Lee, San Francisco, CA (US)

(73) Assignee: Square, Inc., San Francisco, CA (US)

(*) Notice: Subject to any disclaimer, the term of this patent is extended or adjusted under 35 U.S.C. 154(b) by 0 days.

(21) Appl. No.: 14/667,496

(22) Filed: Mar. 24, 2015

(65) Prior Publication Data

US 2015/0235195 A1 Aug. 20, 2015

Related U.S. Application Data

(62) Division of application No. 14/187,049, filed on Feb. 21, 2014, now Pat. No. 9,037,491.

(60) Provisional application No. 61/909,282, filed on Nov. 26, 2013, provisional application No. 61/921,374, filed on Dec. 27, 2013.

(51) Int. Cl.
*G06Q 20/00* (2012.01)
*G06Q 20/20* (2012.01)
*G06Q 20/34* (2012.01)

(52) U.S. Cl.
CPC ......... *G06Q 20/204* (2013.01); *G06Q 20/209* (2013.01); *G06Q 20/34* (2013.01); *G06Q 20/351* (2013.01)

(58) Field of Classification Search
None
See application file for complete search history.

(56) References Cited

U.S. PATENT DOCUMENTS

| | | |
|---|---|---|
| 5,960,411 A | 9/1999 | Hartman et al. |
| 6,705,520 B1 * | 3/2004 | Pitroda et al. ............ 235/382.5 |
| 6,738,749 B1 | 5/2004 | Chasko |
| 6,763,399 B2 | 7/2004 | Margalit et al. |
| 7,069,240 B2 | 6/2006 | Spero et al. |
| 7,305,129 B2 | 12/2007 | Chellapilla et al. |
| 8,135,624 B1 | 3/2012 | Ramalingam et al. |
| 8,498,900 B1 | 7/2013 | Spirin et al. |
| 8,645,222 B1 | 2/2014 | Tamassia et al. |
| 9,037,491 B1 | 5/2015 | Lee |
| 2002/0188535 A1 | 12/2002 | Chao et al. |
| 2003/0065618 A1 | 4/2003 | VanDeBoe, Jr. |
| 2003/0208386 A1 | 11/2003 | Brondrup |

(Continued)

FOREIGN PATENT DOCUMENTS

WO 2015/100385 A1 7/2015

OTHER PUBLICATIONS

FullContact Developer API (Jun. 15, 2013). Card Reader Overview.*

(Continued)

*Primary Examiner* — Peter L. Ludwig
(74) *Attorney, Agent, or Firm* — Lee & Hayes, PLLC

(57) ABSTRACT

Disclosed are method and apparatus that enable a cardless payment transaction to be executed from a merchant point-of-sale (POS) system. A user is enabled to check in at a merchant by using a mobile device of the user and then to pay by simply appearing at the merchant and mentioning his name. By emulating card read events and intercepting receipt printer outputs, the technique cleanly integrates into a conventional merchant POS system, without the need for customized software or hardware to accommodate individual POS vendor-proprietary application programming interfaces (APIs).

5 Claims, 11 Drawing Sheets

(56) References Cited

U.S. PATENT DOCUMENTS

| | | |
|---|---|---|
| 2003/0212609 A1 | 11/2003 | Blair et al. |
| 2004/0029569 A1 | 2/2004 | Khan et al. |
| 2006/0047576 A1 | 3/2006 | Aaltonen et al. |
| 2007/0069013 A1 | 3/2007 | Seifert et al. |
| 2007/0260513 A1 | 11/2007 | Pavlov |
| 2008/0040233 A1 | 2/2008 | Wildman et al. |
| 2008/0041937 A1 | 2/2008 | Vawter |
| 2008/0126260 A1* | 5/2008 | Cox et al. ............ 705/67 |
| 2008/0167961 A1 | 7/2008 | Wentker et al. |
| 2008/0215475 A1 | 9/2008 | Ramer et al. |
| 2009/0043696 A1 | 2/2009 | Ornce et al. |
| 2009/0065571 A1 | 3/2009 | Jain |
| 2009/0157547 A1 | 6/2009 | Ruckart |
| 2009/0159663 A1 | 6/2009 | Mullen et al. |
| 2009/0187466 A1 | 7/2009 | Carter et al. |
| 2009/0187488 A1 | 7/2009 | Shamilian |
| 2009/0187492 A1 | 7/2009 | Hammad et al. |
| 2009/0228325 A1 | 9/2009 | Simmons et al. |
| 2009/0307140 A1 | 12/2009 | Mardikar |
| 2009/0313101 A1 | 12/2009 | McKenna et al. |
| 2009/0327135 A1 | 12/2009 | Nguyen et al. |
| 2010/0019033 A1 | 1/2010 | Jolivet |
| 2010/0030651 A1 | 2/2010 | Matotek et al. |
| 2010/0082445 A1 | 4/2010 | Hodge et al. |
| 2010/0138344 A1 | 6/2010 | Wong et al. |
| 2010/0169179 A1 | 7/2010 | Ramer et al. |
| 2010/0185514 A1 | 7/2010 | Glazer et al. |
| 2010/0191551 A1 | 7/2010 | Drance et al. |
| 2010/0293065 A1 | 11/2010 | Brody et al. |
| 2011/0184822 A1 | 7/2011 | Matkovic |
| 2011/0307342 A1 | 12/2011 | Haji |
| 2012/0005076 A1 | 1/2012 | Dessert et al. |
| 2012/0010938 A1 | 1/2012 | Standley et al. |
| 2012/0143707 A1* | 6/2012 | Jain .................. G06Q 20/20 705/18 |
| 2012/0198279 A1 | 8/2012 | Schroeder |
| 2012/0253852 A1 | 10/2012 | Pourfallah et al. |
| 2012/0331134 A1* | 12/2012 | Lynn et al. .......... 709/224 |
| 2013/0132274 A1 | 5/2013 | Henderson et al. |
| 2013/0159119 A1 | 6/2013 | Henderson et al. |
| 2013/0198076 A1 | 8/2013 | Zambelli Hosmer et al. |
| 2013/0218721 A1* | 8/2013 | Borhan ............ G06Q 30/0207 705/26.41 |
| 2013/0290127 A1 | 10/2013 | Finseth |
| 2013/0295882 A1 | 11/2013 | Zhao |
| 2014/0095310 A1 | 4/2014 | Slonimsky et al. |
| 2014/0162598 A1 | 6/2014 | Villa-Real |
| 2014/0244489 A1 | 8/2014 | Kessler et al. |
| 2015/0066699 A1 | 3/2015 | Fisher |
| 2015/0095134 A1 | 4/2015 | Parker et al. |
| 2016/0055583 A1 | 2/2016 | Liberty et al. |

OTHER PUBLICATIONS

"Square Pay-by-Name, Pay with your phone! Square Card case frees you of credit cards," Posted by AppJudgment, on Sep. 7, 2011, Retreived from the Internet URL: https://www.youtube.com/watch?v=d3CYigOjx8o, pp. 1-16.*

"Square-Pay-by-Name," Pay with your phone! Square Card case frees you of credit cards, Posted by AppJudgment, on Sep. 7, 2011, Retreived from the Internet URL: https://www.youtube.com/watch?v=d3CYigOjx8o, YouTube.com, pp. 1-15.

Goode, L., "Paying With Square's New Mobile-Payments App," Search All Things D, Apr. 30, 2012, Retrieved from the Internet URL: http://allthingsd.com/20120430/paying-with-squares-new-mobile-payments-app/, pp. 1-6.

Grove, J. V., "How Square's New Pay-With-Your-Name System Works," Mashable, May 23, 2011, Retrieved from the Internet URL: http://mashable.com/2011/05/23/square-card-case/#_, on Sep. 10, 2014, pp. 1-17.

Grove, J. V., "Square Announces New Consumer Initiative: Pay With Your Name," Mashable, May 23, 2011, Retrieved from the Internet URL: http://mashable.com/2011/05/23/square-pay-with-name/, on Sep. 10, 2014, pp. 1-23.

Morrow, E. S., "Pay-by-name purchasing: changing the future of spending," Kmov.com, St.Louis, Dec. 29, 2011, Retrieved from the Internet URL: http://www.kmov.com/news/technology/Pay-by-name-purchasing-changing-the-future-of-spending-136411238.html, on Sep. 10, 2014, pp. 1-5.

Roland, M., "Software Card Emulation in NFC-enabled Mobile Phones: Great Advantage or Security Nightmare?," Fourth International Workshop on Security and Privacy in Spontaneous Interaction and Mobile Phone Use (IWSSI/SPMU), Newcastle, UK, (Jun. 18, 2012), pp. 1-6.

International Search Report and Written Opinion for International Patent Application No. PCT/US2014/072285, mailed Mar. 31, 2015.

Requirement Restriction mailed Apr. 15, 2014 for U.S. Appl. No. 14/187,049, of Lee, R., filed Feb. 21, 2014.

Non-Final Office Action mailed Jul. 10, 2014 for U.S. Appl. No. 14/187,049, of Lee, R., filed on Feb. 21, 2014.

Final Office Action mailed Sep. 25, 2014 for U.S. Appl. No. 14/187,049, of Lee, R., filed Feb. 21, 2014.

Notice of Allowance mailed Feb. 27, 2015 for U.S. Appl. No. 14/187,049, of Lee, R., filed Feb. 21, 2014.

U.S. Appl. No. 14/183,450, of Lee, R., filed Feb. 18, 2014.

U.S. Appl. No. 14/187,104, of Lee, R., filed Feb. 21, 2014.

Advisory Action mailed Oct. 17, 2014, for U.S. Appl. No. 14/187,049, of Lee, R., filed Feb. 21, 2014.

Non-Final Office Action mailed Apr. 27, 2015, for U.S. Appl. No. 14/183,450, of Rose, C., et al., filed Feb. 18, 2014.

Final Office Action mailed Oct. 26, 2015, for U.S. Appl. No. 14/183,450, of Rose, C., et al., filed Feb. 18, 2014.

Non-Final Office Action mailed Apr. 8, 2016, for U.S. Appl. No. 14/187,104, of Lee, R., et al., filed Feb. 21, 2014.

Non-Final Office Action mailed Aug. 23, 2016, for U.S. Appl. No. 14/183,450, of Rose, C., et al., filed Feb. 18, 2014.

Examination Report No. 1 for Australian Patent Application No. 2014369891, mailed Nov. 3, 2016.

Non-Final Office Action mailed Dec. 7, 2016, for U.S. Appl. No. 14/187,104, of Lee, R., filed Feb. 21, 2014.

* cited by examiner

OK TO ENTER: /P.L.L./

CARD READER EMULATION FOR CARDLESS TRANSACTIONS

This application is a divisional of U.S. patent application Ser. No. 14/187,049 filed on Feb. 21, 2014, which claims the benefit of U.S. provisional patent application No. 61/909,282, filed on Nov. 26, 2013, and U.S. provisional patent application No. 61/921,374, filed on Dec. 27, 2013, each of which is incorporated herein by reference in their entirety.

BACKGROUND

The traditional manner of paying by credit card in a restaurant or other full-service retail establishment is inefficient and time-consuming. For example, when a customer in a restaurant wishes to pay by credit card, he typically does so by first getting the waiter's attention and then requesting a check. The customer then waits several minutes for the check. After the waiter brings the check, the customer waits several more minutes for the waiter to return and collect the customer's credit card, and then waits several more minutes for the waiter to return with a printed receipt. While the customer is waiting for the receipt, the waiter brings the credit card to a point-of-sale (POS) terminal, runs the card through a card reader, and waits for an authorization signal to come back and for a paper receipt to be printed. When the customer receives the printed receipt from the waiter, the customer writes any tip (gratuity) that he wishes to add onto the receipt and then signs the receipt. The waiter then collects the signed receipt (typically after the customer has left the establishment) and enters the total amount of the transaction (including tip) into the POS system.

This process is very time-consuming and inefficient, from the perspectives of the customer, who may be in a hurry to leave the restaurant, the waiter, who may be busy serving other customers, and the restaurant owner, who may require high efficiency from service employees in order to remain profitable.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
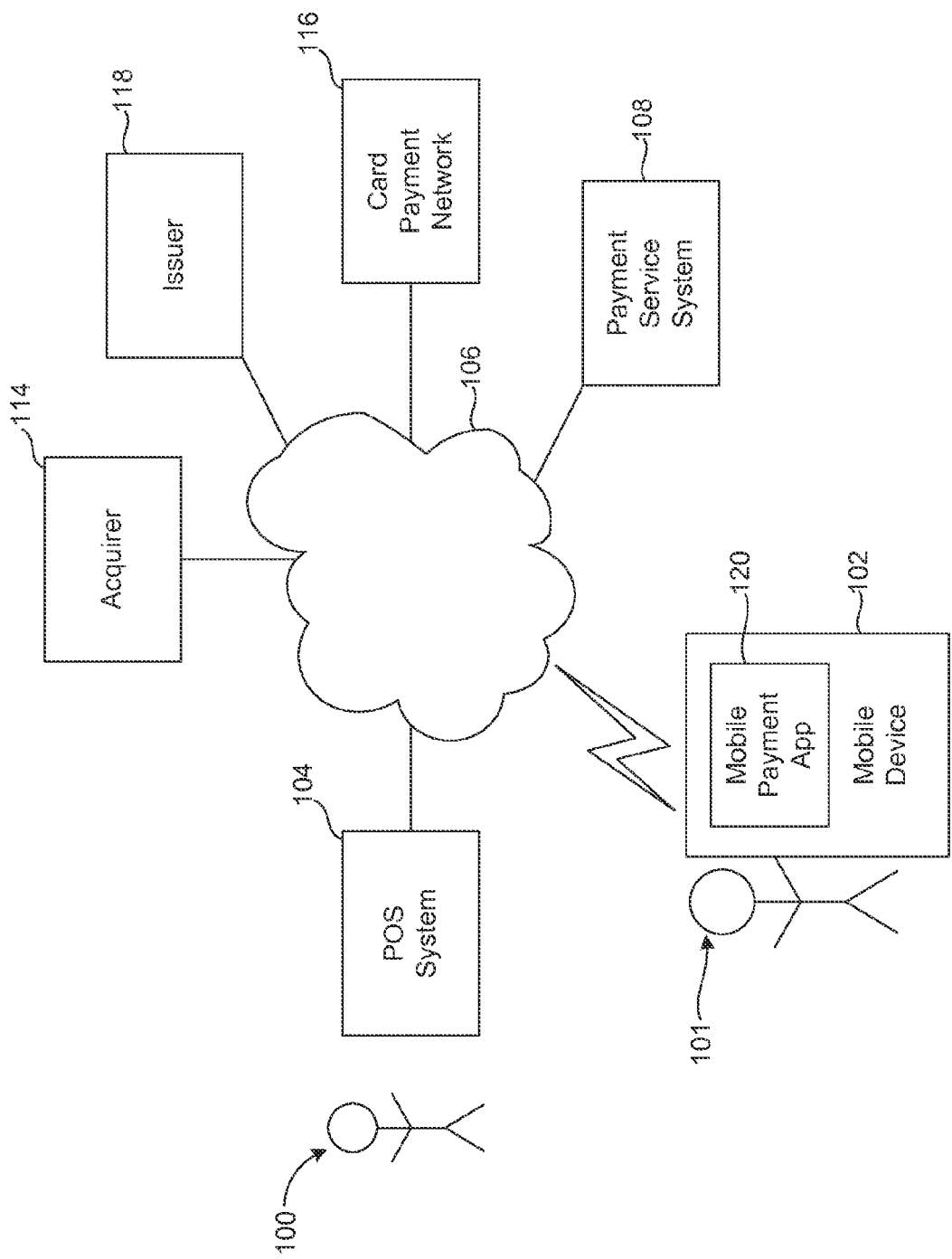
FIG. 1 illustrates an environment in which the card emulation technique introduced here can be implemented.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here is a technique that enables more efficient payment by use of a payment account, such as a credit card or debit card account. The technique eliminates the need for a customer to carry a physical payment card (e.g., a credit card or debit card) and eliminates the need to do a physical card swipe (or other similar physical card read event) when performing a payment card transaction. The technique is particularly advantageous when applied to a full-service retail establishment, such as a restaurant; in particular, the technique facilitates a "pay-by-name" paradigm in which a customer can pay essentially by just telling the merchant his name. Additionally, by emulating card read events and intercepting receipt printer outputs, as described further below, the technique introduced here can cleanly integrate into essentially any conventional POS system, without the need for customized software or hardware to accommodate individual POS vendors' proprietary application programming interfaces (APIs).

In the following description, the example of a restaurant is used, for illustrative purposes only, to explain various aspects of the technique. Note, however, that the technique introduced here is not limited in applicability to restaurants or to any other particular kind of business. Additionally, the technique introduced here is not limited to use with payment cards or even to financial transactions. The technique can be employed with essentially any transaction that traditionally would be initiated by or involve the use of a physical card reader. Hence, the term "sale", as in point-of-sale (POS), refers to any type of payment-oriented transaction, including a lease or rental for example, and is not limited to an actual purchase. Note also that in this description, the term "user" generally refers to a customer (as opposed to a merchant), except where otherwise indicated, and except that the term "user interface" does not necessarily refer to an interface used by a customer, as will be apparent from the context.

In certain embodiments, the technique introduced here involves the following sequence of actions, as described more fully below. Initially, a customer registers with a cardless payment service. At some later time, the customer visits a merchant and "checks in" to the merchant by using a mobile payment application on the customer's mobile device (e.g., a smartphone or tablet computer). The check-in action triggers a sequence of messages and other actions that cause the customer's name and photo to appear relatively immediately on a display device of the merchant's POS terminal.

When the customer is ready to pay, he simply tells the merchant that he wants to pay with the payment service (preferably mentioning the service by its advertised trade name). The merchant then closes the ticket, or "tab", in the merchant POS system in the traditional way. However, when it is time to swipe a credit card through the merchant's card reader, the waiter instead simply taps the customer's name or photo displayed on the merchant POS terminal. The term "swipe" here refers to any manner of triggering a physical card reader to read a physical card, such as passing a card through a magnetic stripe reader, smartcard reader, optical code reader, radio frequency identification (RFID) reader, etc.

A card read emulator (CRE) module in the merchant POS system enables the cardless payment technique to cleanly integrate into essentially any conventional POS system. It does so by emulating physical card read events and intercepting receipt printer output at the merchant POS system. More specifically, and as described in detail below, the CRE module responds to the merchant's triggering input by sending a virtual card swipe to the main POS software in the POS system. The CRE module also intercepts the receipt printing once the transaction has been authorized. Instead of printing a physical receipt, the CRE module causes a virtual copy of the receipt to be sent to the customer's mobile device, where it is displayed to the customer by the mobile payment application. For print operations that are not associated with a cardless transaction, the CRE module simply allows those to pass unaffected to the printer.

After some time, the customer may input a tip amount into the mobile payment application on his mobile device. The CRE module then instructs the merchant to enter the tip into their POS terminal as if it were a "virtual merchant copy." Other ways of inputting the tip amount and variations upon the disclosed technique are also described below.

As described further below, the CRE module may be integrated within the merchant POS terminal, or it may be a separate device. If it is integrated within the POS terminal, it may be an integral part of the main POS software application, or it may be a separate add-on software application or hardware device. The CRE module emulates the output of a physical card reader used by the merchant, where no actual card read event occurs in relation to the payment transaction. It does so by invoking the POS system's (well published) card reader API 207 associated with the particular card reader used by the merchant, and sending the data that emulates the output of the card reader to the main POS application in the output protocol used by the card reader. The card reader can be, for example, a conventional magnetic stripe card reader, a smartcard (integrated circuit (IC) card) reader, barcode reader, quick response (QR) code reader, RFID card reader, or the like.

After the transaction has been approved by a remote payment processing entity, the CRE module prevents generation of a printed receipt by using the POS terminal's (well published) printer API to intercept a print signal generated by the main POS application (for print operations that are not associated with a cardless transaction, the CRE module simply allows those to pass unaffected to the printer). In response to the print signal, the CRE module causes a message to be sent from the merchant POS system to a remote computer system of the cardless payment service, which responds by sending a message to the consumer's mobile device to cause the mobile payment application to display a virtual receipt for the transaction.

FIG. 1 illustrates an environment in which the cardless payment technique can be implemented. The environment includes a merchant POS system of a merchant 100 and a mobile device 102 of a user 101 (also referred to as "customer" or "consumer"). The mobile device 102 can be, for example, a smart phone, tablet computer, notebook computer, or any other form of mobile processing device. A mobile payment application 120 runs on the user's mobile device 102. The environment also includes a computer system 114 of the merchant's acquirer, a computer system 118 of an issuing bank, a computer system 116 of a card payment network, and a computer system 108 of a payment service (hereinafter "payment service system 108"). Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be or include the Internet and one or more wireless networks (e.g., a WiFi network and or a cellular telecommunications network).

The environment illustrated in FIG. 1 can accommodate both traditional payment card transactions (i.e., those involving reading of physical card of the customer at the merchant's location), as well as cardless transactions according to the technique introduced here. In a traditional credit card transaction, for example, the merchant swipes the user's credit card through a card reader at the POS system 104. The POS system 104 sends data read from the card (e.g., the cardholders name, credit card number, expiration date and card verification value (CVV)) to the computer system 114 of the merchant's acquirer (hereinafter "acquirer 114"). The acquirer 114 sends this data to the computer system 116 of the card payment network (e.g., Visa or MasterCard) (hereinafter "card payment network 116"), which forwards the data to the computer system 118 of the issuing bank (hereinafter "issuer 118"). If the transaction is approved by the issuer 118, a payment authorization message is sent from the issuer 118 to the merchant POS system 104 via a path opposite of that described above.

A cardless payment service operates the payment service system 108 to facilitate cardless payment transactions. The user's mobile device 102 can communicate with the payment service system 108 over internetwork 106. The payment service system 108 includes one or more server computers programmed to process payment transactions involving users registered with the cardless payment service. It also stores information such as registered credit card numbers, debit card numbers, bank accounts, user accounts, user identifying information or other sensitive information. The payment service system 108 is also responsible for sending information about merchants who have accounts with the cardless payment system to the user's mobile device 102.

Figure 2A:
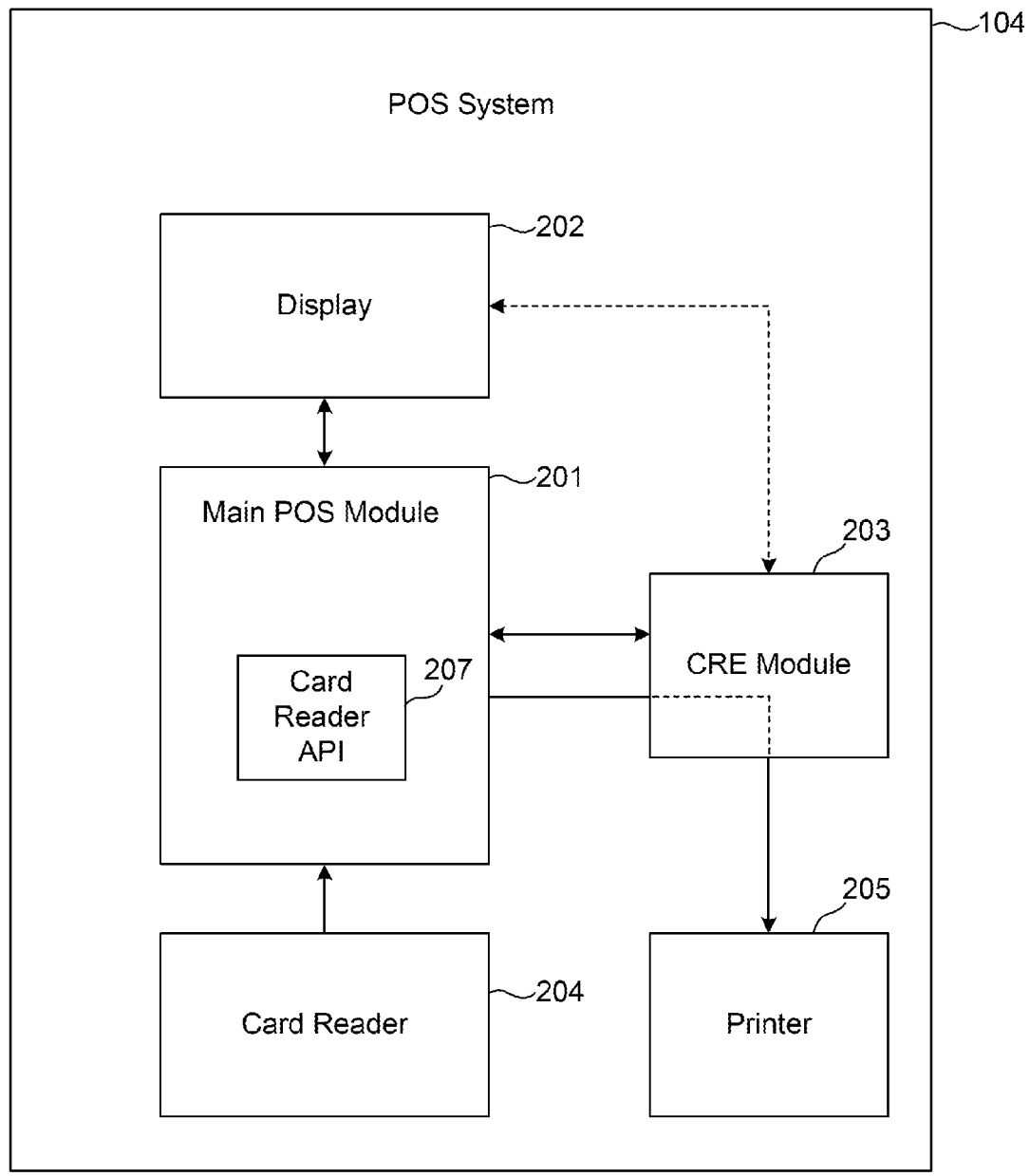
FIGS. 2A and 2B illustrate different embodiments of a merchant POS system.
Figure 2B:
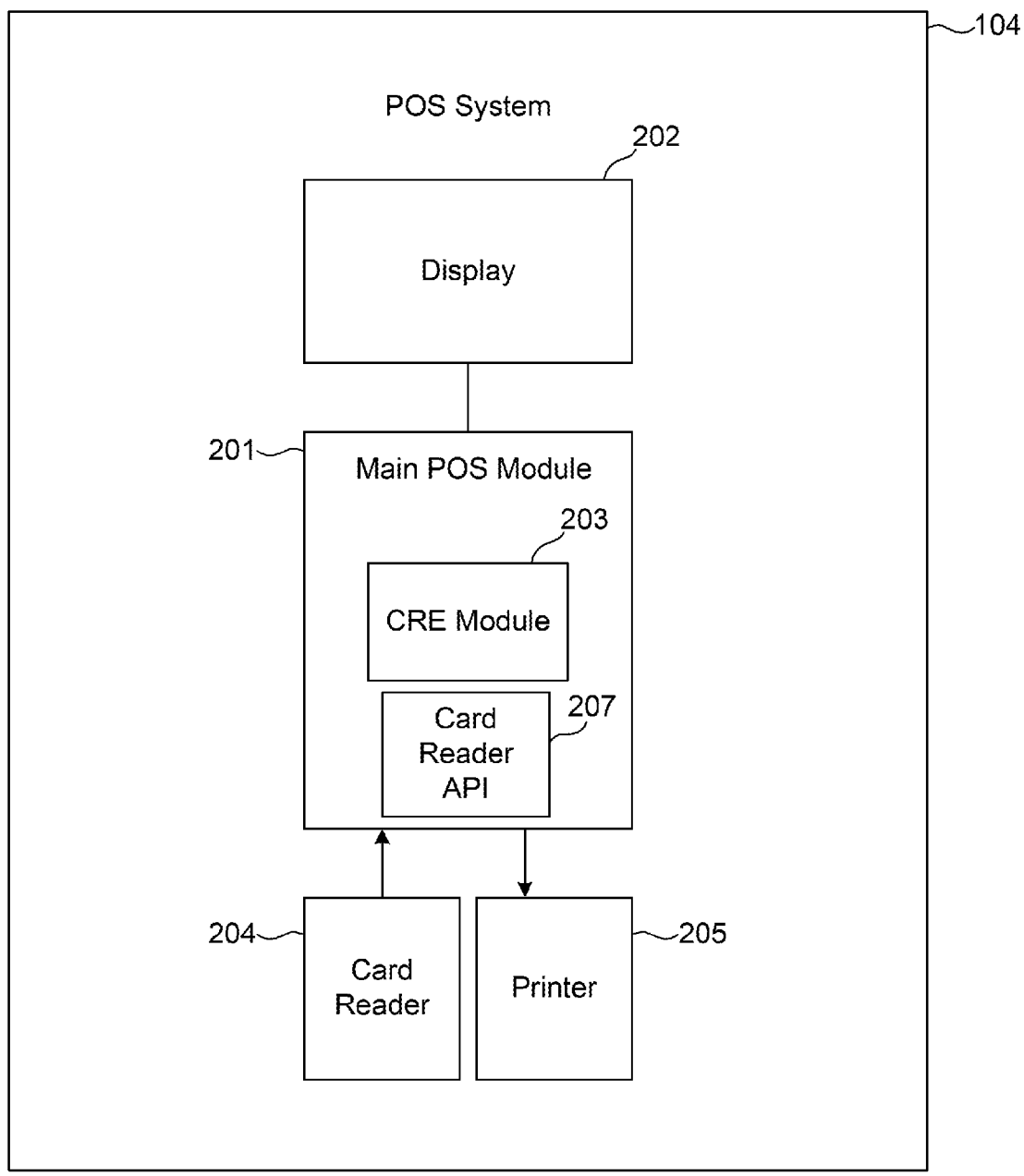

FIGS. 2A and 2B illustrate different embodiments of the merchant POS system 104. Note that certain components that are not germane to this description may not be shown. Referring first to FIG. 2A, the merchant POS system 104 includes a main POS module 201 and a display 202. The main POS module 201 may be a software application, e.g., a main POS application 201, as henceforth assumed herein to facilitate description. Alternatively, it could be a hardware component (which may include a POS application and/or other POS software). The display 202 can be, for example, a touchscreen display, or a traditional non-touch display (in which case the merchant POS system 104 likely also includes a separate keyboard or other input device). The merchant POS system 104 also includes a card reader 204, such as a magnetic stripe card reader or a smartcard reader, and a receipt printer 205 for printing transaction receipts.

In accordance with the technique introduced here, the POS system 104 also includes a CRE module 203 that communicates with the main POS application 201. The CRE module 203 may also communicate with the display 202, either directly or through the main POS application 201. The CRE module 203 can be software, hardware, or a combination thereof. As illustrated in FIG. 2A, the CRE module 203 can be logically separate from the main POS module but operate "along side" it. Alternatively, the CRE module 203 can be an integral part of the main POS application 201, as shown in FIG. 2B. Other alternatives include binding virtual USB devices or implementing the CRE module 203 as a separate hardware device that connects between the merchant POS terminal and the card reader 204 and printer 205.

The CRE module 203 has two main functions. Firstly, it emulates card read events to the main POS module, by using a protocol and API 207 associated with the card reader. Secondly, it intercepts print signals generated by the main POS application 201 for the printer 205, by using an API of the printer 205, and triggers a sequence of operations to cause a virtual receipt to be sent to the user's mobile device 102. These functions enable the customer to pay by credit or debit in a cardless transaction, without the need to customize software or hardware to accommodate individual POS vendor-proprietary APIs.

Figure 3:
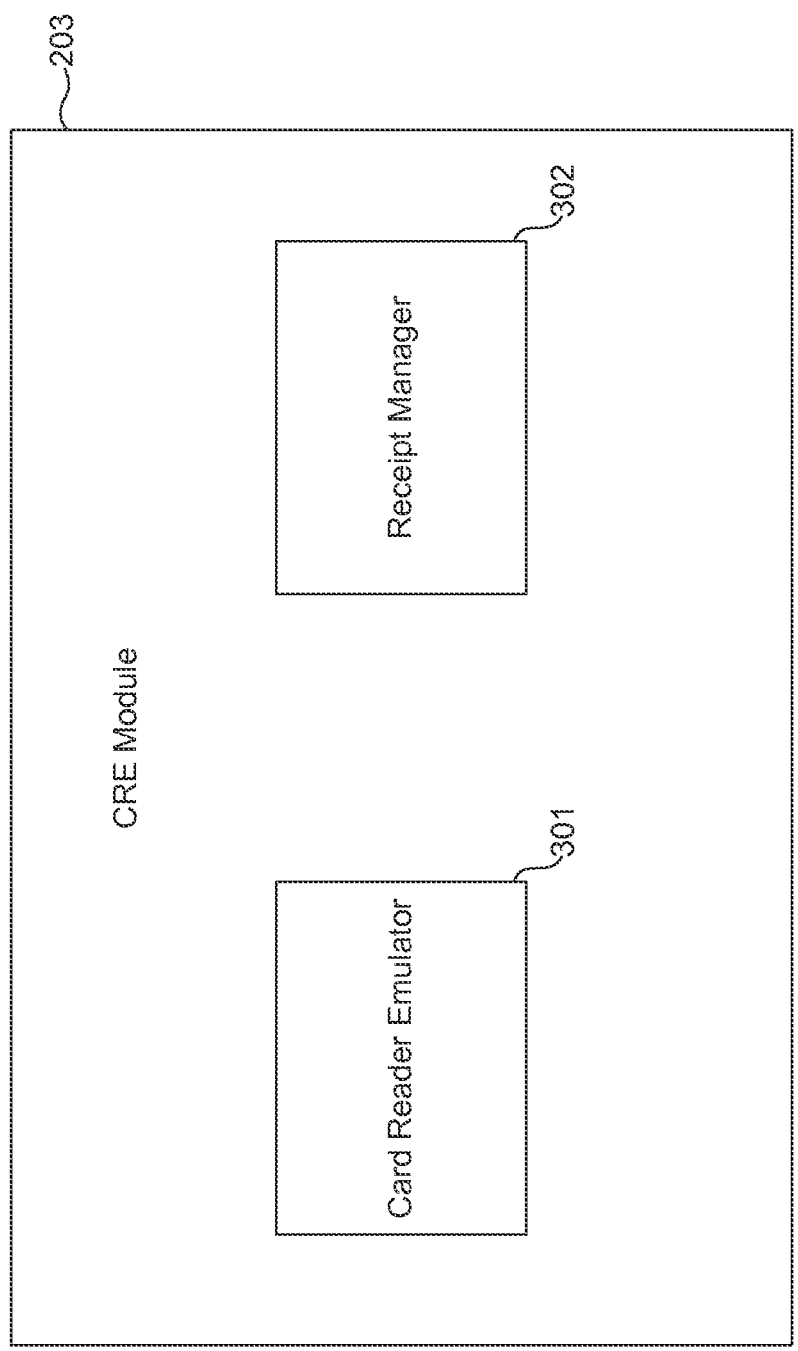
FIG. 3 illustrates an example of a card read emulator (CRE) module used in a POS system.

Accordingly, as shown in FIG. 3, in certain embodiments the CRE module 203 includes a card reader emulator 301 and a receipt manager 302. The card reader emulator 301 is responsible for emulating card read events to the main POS application 201. The receipt manager 302 is responsible for intercepting print signals generated by the main POS application 201 and triggering the sequence of operations to cause a virtual receipt to be sent to the user's mobile device 102. Dynamic-link library (DLL) injection can be used to intercept and modify communications between the main POS application 201 and the standard Windows USB APIs (e.g., used for a magnetic stripe card reader) and printer APIs.

Note that certain POS systems might integrate with a card processing terminal instead of a magnetic stripe reader. In those cases, the CRE module 203 can simply emulate the card processing terminal.

Before a cardless transaction between the user and the merchant can be performed, the mobile payment application 120 is installed on the user's mobile device 102 (e.g., through an online application store) and the CRE module 203 is installed on the merchant POS system 104. Additionally, the user is required to create a user account with the payment service system 108. The user can do so from the mobile device 102 by using the mobile payment application 120 or a mobile web browser, or by using another processing device such as a home computer with a conventional web browser.

In certain embodiments, the user enters a name, account password, and contact information, e.g., email address. Before a cardless payment transaction can be performed, the user also enters financial account information sufficient to conduct the transaction into the payment service system 108. For example, in the case of a credit card account, the user can enter the credit card issuer, credit card number and expiration date into the payment service system 108; the CVV and mailing address may also be required. However, the financial account could also be associated with a debit card or pre-paid card, or another third party financial account.

In some embodiments, the payment service requires that the user provide additional personal identifying information before a cardless transaction will be allowed, such as a photo of the user. The photo of the user would later be provided to the merchant (e.g., via the CRE module 203) so that the merchant can compare the photo to the person at the merchant's location. In addition, the payment service can require a personal identification number (PIN) be entered by the user. Other requirements can also be added to increase security. The data associated with the user's account can be stored in a database (not shown) at the payment service system 108.

In operation, the user carries the mobile device 102 with the mobile payment application 120 installed, and the merchant uses the POS system 104 as described above. The mobile payment application 120, CRE module 203, payment service 108 and main POS application 201 interact to enable the user to pay by a cardless transaction. This is accomplished, in part, by determining a relative location between the user's mobile device 102 and the merchant. The system includes the ability to determine the current location of the user's mobile device 102 with a relatively high degree of accuracy. For example, the mobile device 102 may have an internal geolocation device, such as a global positioning system (GPS) receiver. Alternatively, the location of the mobile device 102 may be determined by the wireless network, e.g. using radio frequency (RF) signal triangulation or other known technique. The location of the merchant is assumed to be well known and pre-stored within the payment service system 108.

The cardless payment service can predetermine a distance, e.g., a radius, from the location of a merchant, such as 500 feet, such that if the mobile device 102 is within that distance from a given merchant and the checks in to the merchant, the system can reliably assume that the user is in fact present at the merchant. If the user is located within the predetermined distance from a merchant, the user will be allowed to "check in" at the merchant by using the mobile payment application 120. This may be done by, for example, the user pressing a simple "check in" button or the like on a display of the mobile device 102. The check-in function may be considered to be an indication of the user's consent to perform a cardless transaction with that particular merchant and effectively "opens a tab" with the merchant. Alternatively, the mobile payment application 120 may be configured to automatically check in the user when the user is within the predetermined distance of the merchant. If, on the other hand, the mobile device 102 is located beyond the predetermined distance from a particular merchant, the user will not be allowed to check in at that merchant. In that case, the user device 102 will indicate to the user that it is too far from the merchant to check-in.

Figure 4:
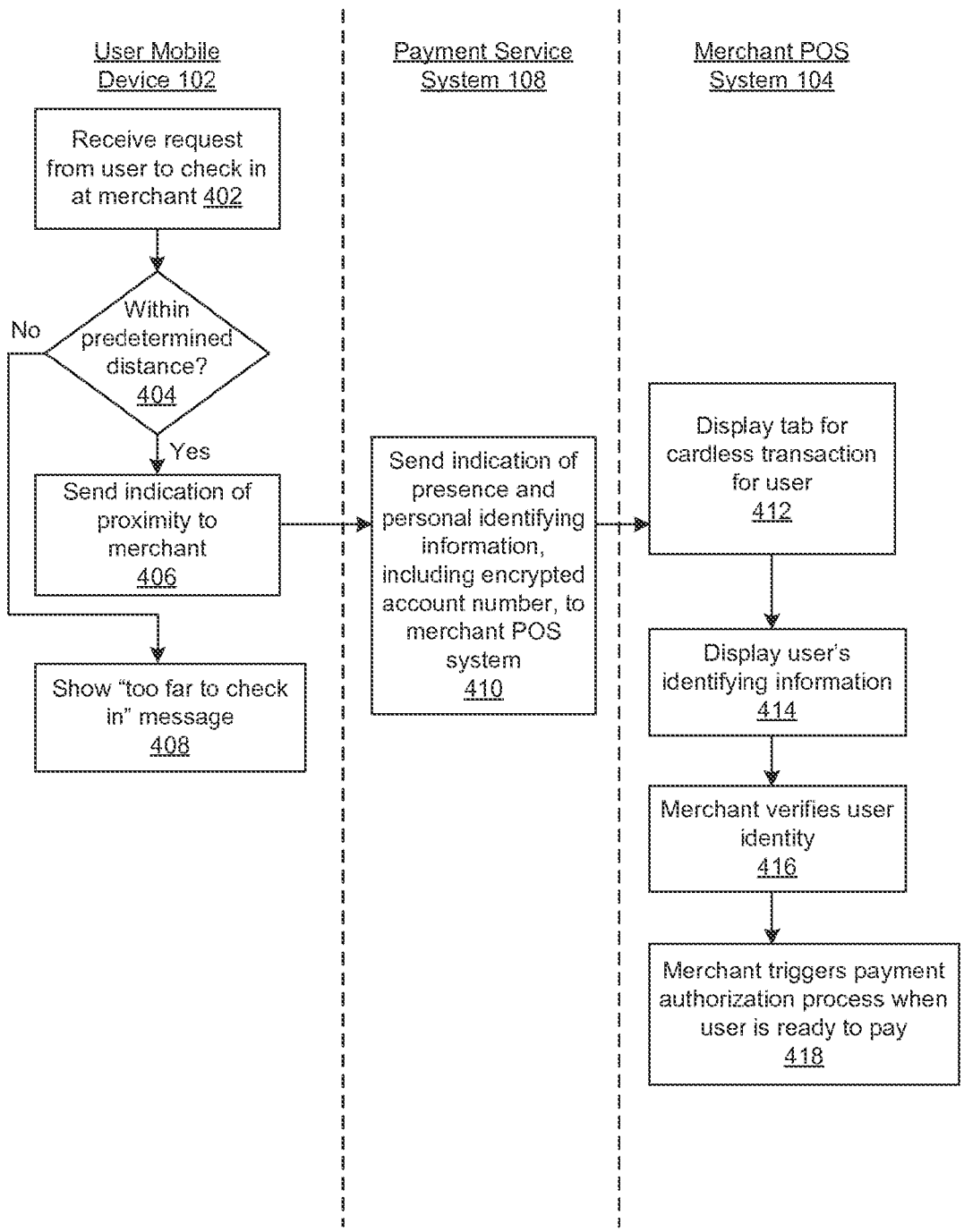
FIG. 4 is a flow diagram illustrating an example of a process for setting up and initiating a cardless payment transaction, according to a first embodiment.

FIG. 4 illustrates an example of a process of setting up and initiating a cardless payment transaction, according to a first embodiment of the technique introduced here. The process involves relationships between the user's mobile device 102, the payment service system 108, and the merchant POS system 104. The payment service system 108 can be configured to send and receive communications to and from the mobile device 102 and the merchant POS system 104. The communications can be encrypted using secure protocols built into the mobile device 102, payment service system 108, and merchant POS system 104. In some embodiments, this process is implemented through the mobile payment application 120 installed on the mobile device 102 and the CRE module 203 on the merchant POS system 104.

Initially, the user inputs a request into the mobile device 102 to identify a merchant that can perform cardless payment transactions. The request may be sent automatically, for example, when the user opens the mobile payment application 120 on the mobile device 102. The mobile device 102 sends the request to the payment service system 108 via the internetwork 106. The request can be accompanied by location information of the mobile device 102, e.g., as determined by the mobile device 102. The payment service system 108 receives the request and selects one or more merchants based on the location information from the customer and the stored location information for the merchant. An identification of the merchant and the location information for the merchant is sent to the mobile device 102.

In some embodiments, the user checks in at the merchant by interacting with the mobile payment application 120 running on the user's mobile device 102 (step 402). When the user checks in, an identification of the merchant and the location information for the merchant is sent to the mobile device 102. The mobile device 102 determines whether it is within the predetermined distance from the merchant (step 404). If the mobile device 102 does not know the current location of the merchant, or if the merchant recently updated its location information, the merchant location can be pushed or pulled into the mobile device 102. Alternatively, if the user opts in to sharing of location information, the location information of the mobile device 102 can be provided to the payment service system 108, which determines the 30 distance between the merchant and the mobile device 102.

As described above, if the mobile device 102 determines the user's mobile device 102 is not within the predetermined distance (e.g. 500 feet), the mobile device 102 displays a message indicating its inability to check in the user (step 408). In that case, the merchant cannot charge the user's financial account by using a cardless payment transaction. On the other hand, if the mobile device 102 is within the predetermined distance, the mobile device 102 sends an indication of proximity to the payment service system 108 (step 406).

After the payment service system 108 receives this indication of proximity, it sends the indication of the mobile device 102's presence and personal identifying information to the merchant POS system 104 (step 410). In some embodiments, the personal identifying information sent to the merchant POS system 104 includes the user's name, photo and financial account number (e.g., credit or debit card number). The financial account number may be encrypted such that it can only be decrypted by the CRE module 203, such that it cannot be displayed by the POS system or otherwise accessed by the merchant.

Figure 5:
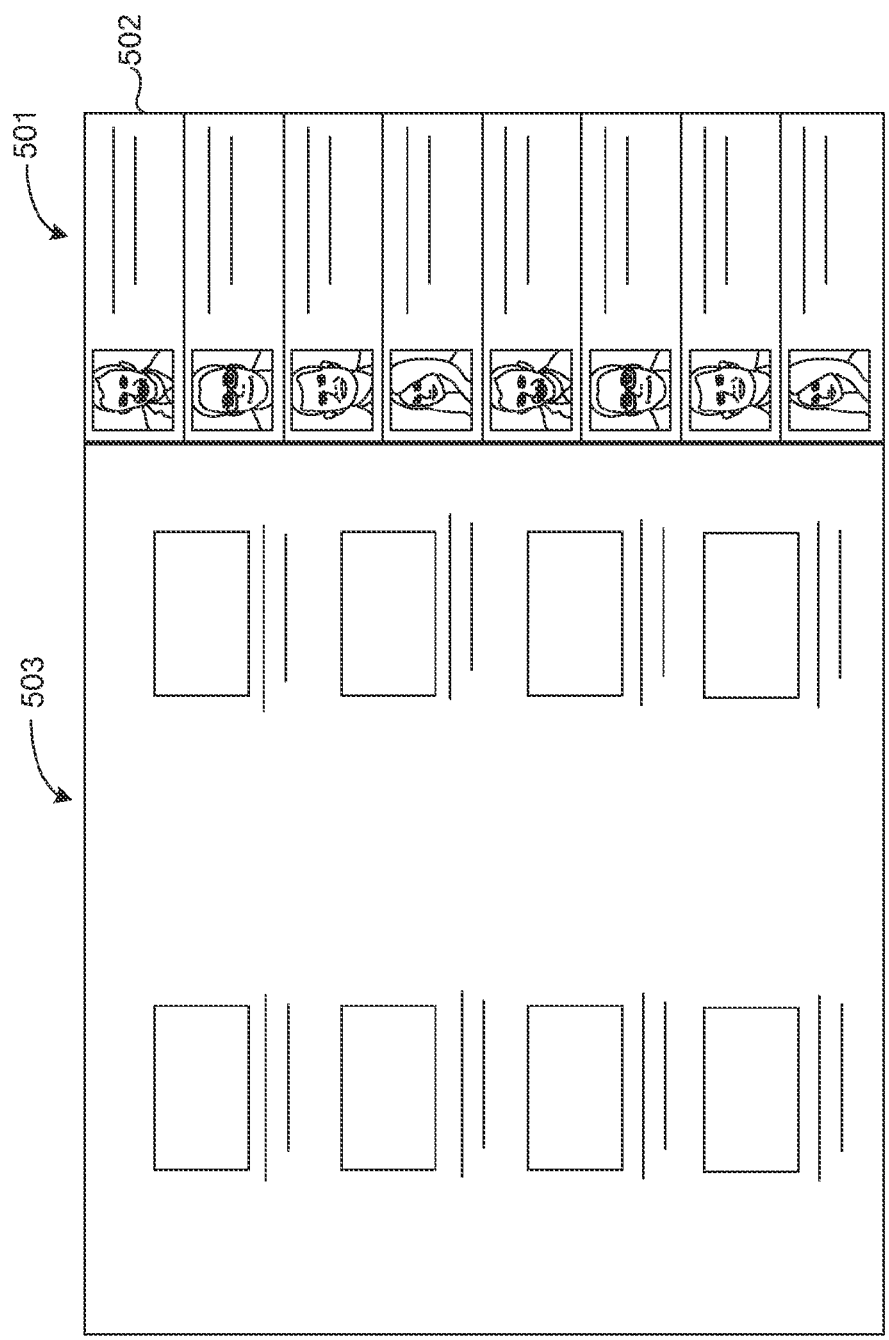
FIG. 5 illustrates an example of a graphical user interface (GUI) display generated by a merchant POS system.

Upon receipt of this information, the merchant POS system 104 displays a tab (a list of items the customer has ordered) (step 412) and the user's identifying information (e.g., name and photo) (step 414) on a graphical user interface (GUI) on its display 202. An example of such a GUI is shown in FIG. 5. In the illustrated example, the right-hand portion 501 of the display is a customer tab section that includes a separate subsection 502 for each customer who has checked in at the merchant via the cardless payment service. The customer tab section 501 can be generated by the CRE module 203, for example, or by other merchant-side POS software. The amount each customer owes can be displayed in the corresponding subsection 502 for that customer on the display.

The left-hand portion 503 of the GUI is generated by the main POS application 201 and contains, for example, names and images of the items that can be ordered/purchased and their prices. In other embodiments, the user information displayed by the CRE module 203 can be provided in a completely separate window from that of the main POS application 201. Hence, in some embodiments, through the GUI the merchant can select items that a customer has requested to purchase. The GUI can be configured to associate individual prices with each of the merchant's items and can automatically sum the total transaction amount that the customer owes.

In some embodiments, displaying of the customer tab section 502 may be triggered automatically when a customer who is registered with the cardless payment service checks in at the merchant. Alternatively, it may be triggered by a soft-button on the GUI generated by the main POS application 201. Such a soft button may be generated by the CRE module 203 and may automatically change appearance when a user registered with the cardless payment service checks in at the merchant.

In yet another embodiment, a hardware button or other similar physical control is provided on a separate hardware module (not shown) that connects externally to the merchant POS terminal (e.g., via a USB port or other conventional interface) and communicates with the CRE module 203 to trigger the display of the customer tab portion 502. The separate hardware module can emulate a USB keyboard and generate a key combination that causes the merchant POS system 104 to enter the desired state as mentioned above. In an extension of this approach, the hardware module can also contain a storage device (e.g., a USB flash drive) that contains the CRE module 203. Activation of the button or other control on the separate hardware module can cause notifications to be displayed on the display of the POS system 104 and/or light up the button when a customer checks in at the merchant.

A customer (user) can authorize payment for his tab by orally notifying the merchant. For example, a user named John Smith can simply tell the merchant, "Put this on John Smith." Before or after the user authorizes payment for the tab, the merchant verifies the user's identity (step 416), for example by confirming that the photo displayed on the merchant POS system 104 matches the user who is present in person. Assuming the photo matches, the merchant then selects the user's tab (e.g., by tapping the corresponding section 501 on the GUI) to trigger a cardless payment transaction (step 418) when the customer is ready to pay.

Figure 6A:
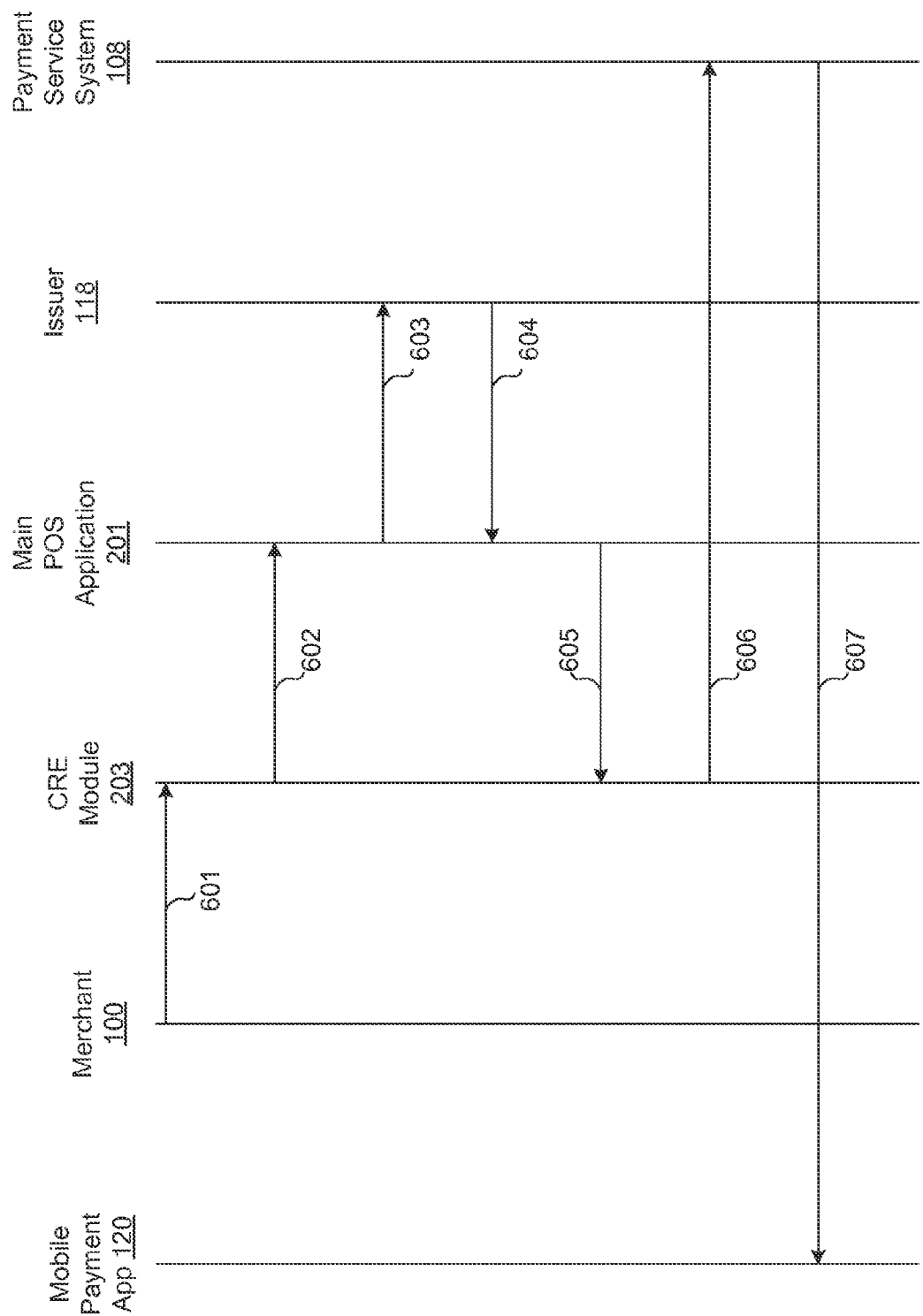
FIG. 6A illustrates operations performed in a cardless payment transaction, according to the first embodiment.

In one embodiment, the cardless payment transaction involves the following operations, as illustrated in FIG. 6. In response to the merchant providing a user input 601 to trigger the cardless payment transaction, the CRE module 203 emulates the card reader by sending, to the main POS application 201, card read event data 602 associated with the consumer. The card read event data 602 appears to the main POS application 201 to be data resulting from a card read event, although no actual card read event has occurred. The CRE module 203 does this by invoking the main POS application's card reader API 207 and sending the data in the output protocol of the card reader 204. In an embodiment consistent with FIG. 4, the CRE module 203 previously received from the payment service system 108 a real payment card account number (e.g., credit card number) of the customer when the customer checked in at the merchant. Accordingly, that account number as well as the consumer's name, card expiration date and CVV are provided by the CRE module 203 to the main POS application 201 in the protocol of the card reader 204. In another embodiment, which is discussed further below, the CRE module 203 or the payment service system 108 generates a one-time-use payment card number for the transaction, and passes that to the main POS application 201 instead of a real payment card number of the consumer. It is not necessary for the CRE module 203 to implement the entire protocol of the card reader, since it only needs to be able to inject simulated card swipes to the main POS application 201. In one embodiment, the CRE module 203 is programmed with DUKPT (Derived Unique Key Per Transaction) keys for the merchant's acquirer, for the purpose of emulating a card swipe. Other data related to the customer may also be provided, if required by the API 207 of the card reader 204.

The main POS application 201, upon receiving the card read event data 602 from the CRE module 203, sends the card read event data in a standard payment authorization request 603 that is forwarded to the issuer 118. In practice, the payment authorization request 603 may actually be sent first to the merchant's acquirer 114, which forwards the request or sends a corresponding new request to the card payment network 116, which then forwards the request or sends a corresponding new request to the issuer 118; however, these intermediate communications are omitted from FIG. 6 to simplify explanation.

If the transaction is approved by the issuer 118, the issuer 118 sends a standard payment authorization (approval) message 604 back to the merchant's main POS application 201, using a communication path opposite of that mentioned above. The main POS application 201 responds to the payment authorization message by generating a print message 605 for the local receipt printer 205 of the merchant POS system 104. However, the CRE module 203, by having access to the main POS application 201's printer API, intercepts the print signal before it can reach the printer 205. In response to detecting the print signal, the CRE module 203 also sends a message 606 to the payment service system 108 (via the internetwork 106) indicating that a payment authorization message has been received. The payment service system 108 responds by sending a message 607 containing a virtual receipt for the transaction to the user's mobile device 102. The mobile payment application 120 on the mobile device 102 then displays the virtual receipt to the user. The virtual receipt can include all of the information that a printed card transaction receipt would include, including the amount charged, name of the consumer, date and time of the transaction, etc. The user can then optionally input a tip amount. Different ways of handling tips in this process are discussed further below.

In certain embodiments, the payment service system 108 parses the receipt data before sending the virtual receipt to the mobile payment application 120, to determine whether the transaction processed successfully or not. It can also parse the receipt data to identify various semantic elements, including the total amount of the transaction and items ordered by the customer. Consequently, in such embodiments the virtual receipt that the payment service system 108 sends to the mobile device 102 also contains an itemization of these elements, which can be displayed to the user. Alternatively, the parsing can be performed by the CRE module 203.

Note that most POS systems use relational databases, such as Sybase or Microsoft's SQL Server, to store their payment card transaction data. The payment service system 108 can capture most if not all essential transaction data by parsing receipts as described above. Nonetheless, it might be desirable to synchronize a merchant's POS database with a database of the payment service system 108. Among other benefits, that would allow the payment service 108 to provide backup storage for merchants.

Figure 6B:
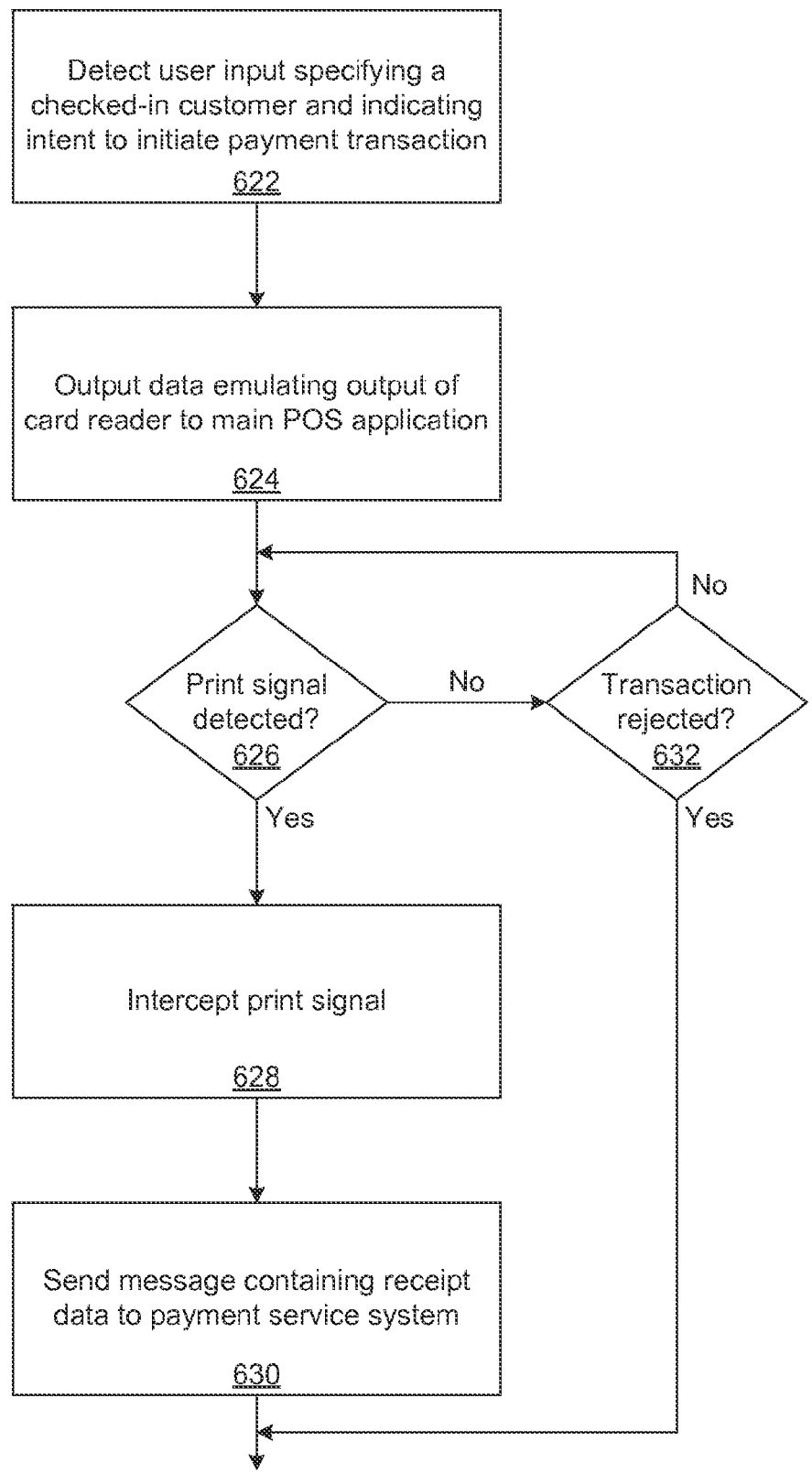
FIG. 6B illustrates a process that can be performed by the card read emulator (CRE) module.

FIG. 6B illustrates an example of a process that can be performed by the CRE module 203 in the embodiment described above. The process begins when the CRE module 203 detects a user input specifying a checked-in customer and being indicative of an intent to initiate a payment transaction involving the customer (step 622). In response to the user input, the CRE module 203 initiates the payment transaction by outputting, to the main POS application 201, data that emulates output of the card reader 204, without an actual card read event having occurred in relation to the payment transaction (step 624). After the transaction has been approved by a payment processing entity (e.g., the issuer 118), when the CRE module 203 detects a print signal generated by the main POS module 201 for generating a transaction receipt (step 626), the CRE module 203 (and more specifically, the receipt manager 302, for example) prevents generation of a printed receipt by intercepting the print signal (step 628). The print signal includes receipt data for enabling a receipt to be printed by the receipt printer 205. In response to the print signal, the CRE module 203 sends a first message to the payment service system 108 (step 630), including at least some of the receipt data, to cause the payment service system 108 to send a second message to the customer's mobile device 102. The second message enables the mobile device 102 to output a virtual receipt for the payment transaction to the consumer.

In the embodiment described above, the CRE module 203 receives from the payment service system 108 an actual payment card number of the user, and passes that number to the main POS application 201 when a transaction is initiated. In another embodiment, however, the cardless payment service generates a one-time-use payment card number for the transaction, and passes that to the main POS application 201 instead of a real payment card number of the consumer, as noted above. The one-time-use card number can be generated by the payment service system 108 or by the CRE module 203 in response to the user checking in at the merchant. In this embodiment, the payment service which operates the payment service system 108 essentially acts as the credit card issuer from the perspective of the merchant. The merchant POS system 104 charges the one-time-use credit card number, and the payment service later charges the consumer's actual credit card number which is stored in the payment service system 108. The initial set-up process in this embodiment can be substantially identical to that of FIG. 4, except that in step 410, the payment service system 108 sends the one-time-use payment account number to the merchant POS system 104 instead of sending the consumer's actual credit card number. The one-time-use account number has a format recognizable by the merchant POS system 104, e.g., a standard credit or debit card format.

Figure 7:
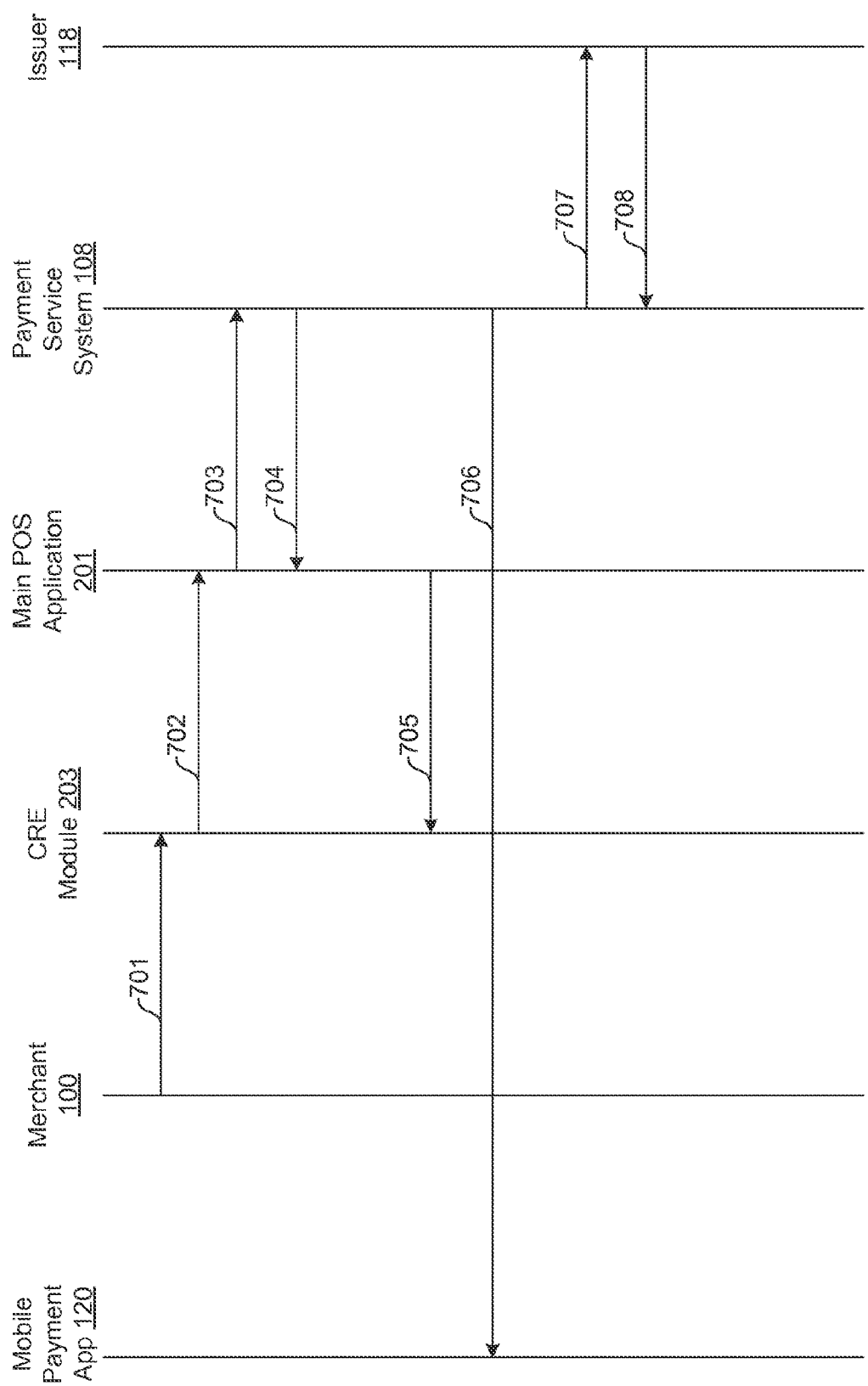
FIG. 7 illustrates operations performed in a cardless payment transaction, according to the second embodiment.

A cardless transaction using the one-time use payment account number can involve the following operations, as illustrated in FIG. 7. In response to the merchant 100 providing a user input 701 to trigger the cardless payment transaction, the CRE module 203 emulates the card reader 204 by sending, to the main POS application 201, data 702 associated with the consumer that appears to the main POS application 201 to be associated with a card read event, although no actual card read event has occurred. This can be done in the manner described above. The one-time-use payment account number as well as the consumer's name, account expiration date and CVV are provided by the CRE module 203 to the main POS application 201 in the protocol of the card reader. Other data related to the consumer may also be provided if required by the API 207 of the card reader.

The main POS application 201, upon receiving the card read event data 702 from the CRE module 203, sends the card read event data in a standard payment authorization request 703 that, in this embodiment, is forwarded to the payment service system 108, which represents the issuer. In practice, the payment authorization request 703 may actually be sent first to the merchant's acquirer 114, which forwards the request or sends a corresponding new request to the card payment network 116, which then forwards the request or generates a corresponding new request to the payment service system 108; however, these intermediate communications are omitted from FIG. 7 to simplify explanation.

If the transaction is approved by the payment service system 108, the payment service system 108 sends a standard payment authorization (approval) message 704 back to the merchant's main POS application 201, using a communication path opposite of that mentioned above. The main POS application 201 responds to the payment authorization message 704 by generating a print signal 705 for the local receipt printer 205 of the merchant POS system 104. However, the CRE module 203 intercepts the print signal 705 and prevents it from reaching the printer 205, as described above. In this embodiment, the payment service system 108 does not need to receive a signal from the CRE module 203 before sending send the virtual receipt, since it already knows the transaction is approved. Accordingly, at approximately the same time that the payment service system 108 sends the payment authorization signal 704, or shortly thereafter, it also sends a message 706 containing a virtual receipt for the transaction to the mobile device 102 of the customer. The mobile payment application 120 on the customer's mobile device 102 then displays the virtual receipt to the user.

At some later time, the payment system 108 sends a payment request 707 to the issuer 118 of an actual payment card of the customer. The information of that actual payment card was previously received and stored by the payment service system 108 when the customer registered for the cardless payment service. The payment service system 108 subsequently receives payment 708 from the issuer 118.

Figure 8:
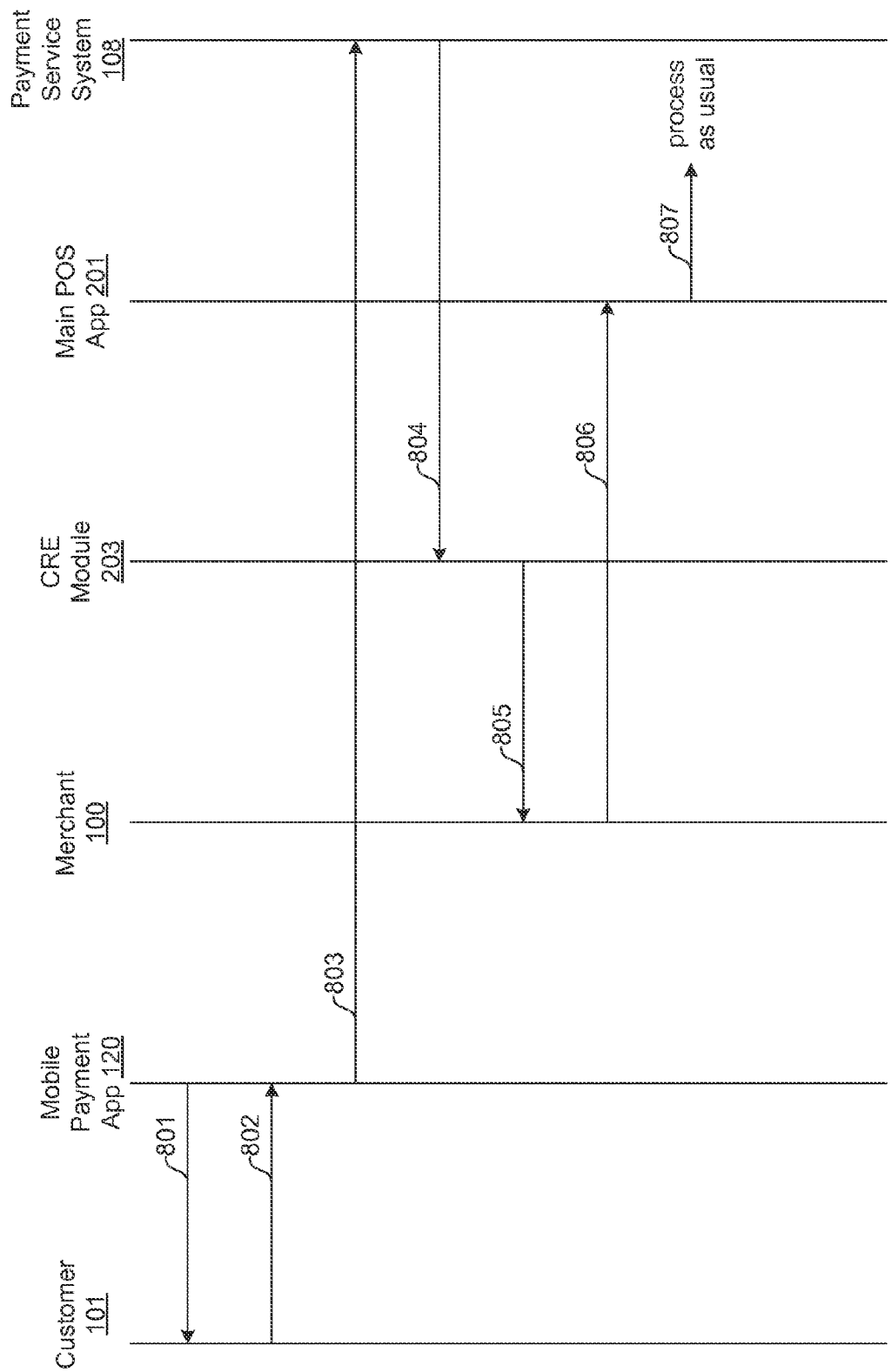
FIG. 8 illustrates operations performed in connection with specifying a tip for a cardless payment transaction.

The technique introduced here also enables a customer to tip the merchant (e.g., a waiter). There are various ways of accomplishing that. In one approach, illustrated in FIG. 8, when the virtual receipt is displayed to the customer 101 by the mobile device 102, the customer is prompted (801) by the mobile payment application 120 running on the mobile device 102 to input a tip amount. Accordingly, the customer inputs (802) a tip amount into the mobile payment application 120. The mobile payment application 120 then sends a message 803 to the payment service system 108 including the tip amount. The payment service system 108 than sends a message 804 to the CRE module 203 in the merchant POS system 104 indicating the tip amount. The CRE module 203 then triggers the display of the merchant POS system 104 to display the tip amount on the display of the merchant POS system (805). The merchant 100 sees the displayed tip amount and then inputs (806) the total transaction amount (e.g., amount charged plus tip) into the main POS application 201 in the traditional manner. The main POS application 201 then processes the transaction according to the traditional transaction capture process (807).

In another approach, rather than requiring the merchant to copy over the tip amount into the main POS application 201, the CRE module 203 simulates a sequence of user inputs (e.g., a sequence of touchscreen or keypad presses) to the main POS application 201, to cause the main POS application 201 to enter an appropriate state for inputting the tip amount (or total transaction amount), and then simulates the proper user input sequence to input that amount into the main POS application 201. For example, the CRE module 203 can invoke an API of an input device of the POS system (e.g., a touchscreen or keyboard/keypad) to communicate the tip amount to the main POS application 201, such that the tip amount appears to the main POS application 201 to have been input by a human user.

In yet another approach, the waiter pre-registers with the payment service system 108 as a merchant (or merchant employee, as the case may be) and identifies himself to the CRE module 203 via the GUI when he arrives at work each day. After a cardless payment transaction has been authorized as described above, the CRE module 203 causes the display to output a prompt asking which waiter should receive the tip. The waiter taps his own name on the display. The CRE module 203 then sends a message indicating this selection to the payment service system 108. The payment service system 108 then pushes the tip directly to the waiter, via automated clearing house (ACH) or debit, for example.

Figure 9:
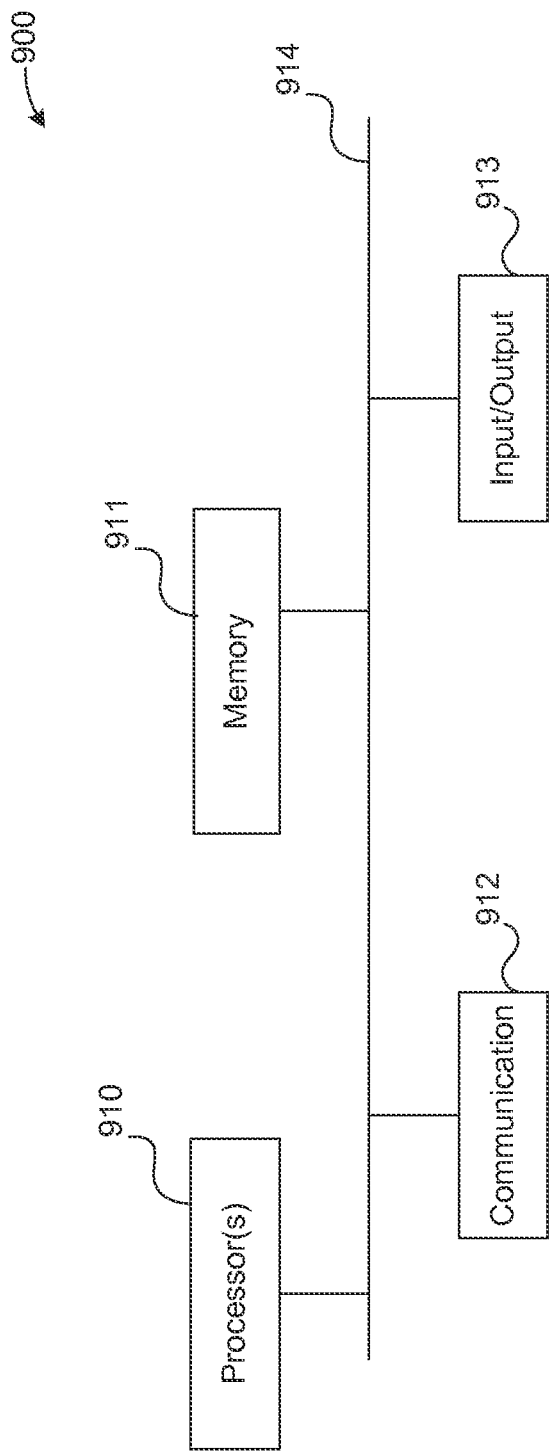
FIG. 9 is a high-level block diagram showing an example of a processing system in which at least some operations related to a cardless transaction can be implemented.

FIG. 9 is a high-level block diagram showing an example of a processing device 900 that can represent any of the devices described above, such as the mobile device 102, the merchant POS system 104, payment service system 108, acquirer system 114, card payment network 116, or issuer system 118. As noted above, any of these systems may include two or more processing devices such as represented in FIG. 9, which may be coupled to each other via a network or multiple networks.

In the illustrated embodiment, the processing system 900 includes one or more processors 910, memory 911, a communication device 912, and one or more input/output (I/O) devices 913, all coupled to each other through an interconnect 914. The interconnect 914 may be or include one or more conductive traces, buses, point-to-point connections, controllers, adapters and/or other conventional connection devices. The processor(s) 910 may be or include, for example, one or more general-purpose programmable microprocessors, microcontrollers, application specific integrated circuits (ASICs), programmable gate arrays, or the like, or a combination of such devices. The processor(s) 910 control the overall operation of the processing device 900. Memory 911 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 911 may store data and instructions that configure the processor(s) 910 to execute operations in accordance with the techniques described above. The communication device 912 may be or include, for example, an Ethernet adapter, cable modem, Wi-Fi adapter, cellular transceiver, Bluetooth transceiver, or the like, or a combination thereof. Depending on the specific nature and purpose of the processing device 900, the I/O devices 913 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. An apparatus comprising:
   a card reader emulator configured to operate as part of a merchant point-of-sale (POS) system, where the merchant POS system is configured to include a physical card reader capable of reading physical payment cards and where the merchant POS system includes POS software that is not part of any card reader, the card reader emulator being configured to detect user input indicative of an intent to initiate a payment transaction involving a consumer and, in response thereto, to initiate the payment transaction by outputting data that emulates a card read event for the payment transaction without a card read event having occurred for the payment transaction, wherein said outputting data that emulates the card read event is performed by invoking a card reader programming interface of the POS software; and
   a receipt manager configured to prevent generation of a printed receipt for the payment transaction by preventing a print signal from being communicated to a printer in relation to said payment transaction, and to cause a message to be sent to a mobile device of the consumer, to enable the mobile device to output a virtual receipt for the payment transaction.

2. An apparatus as recited in claim 1, wherein the card reader programming interface is a card reader application programming interface (API) of the POS software.

3. An apparatus as recited in claim 1, wherein the receipt manager is configured to parse receipt data in the print signal to identify semantic elements of the receipt data.

4. An apparatus as recited in claim 1, wherein the apparatus is configured to cause the message to be sent to the mobile device of the consumer by sending the first message to a remote entity via a network, to cause the remote entity to send the message to the mobile device of the consumer.

5. An apparatus as recited in claim 1, wherein the apparatus is configured to emulate output of the physical card reader by outputting a one-time-use payment account identifier for use only for said payment transaction, wherein the one-time-use payment account identifier is not a payment account identifier of a payment card of the consumer.

* * * * *